(12) United States Patent
Mulvaney et al.

(10) Patent No.: US 8,584,894 B1
(45) Date of Patent: Nov. 19, 2013

(54) KITCHEN APPLIANCE AND METHOD OF USING SAME

(75) Inventors: Patrick T. Mulvaney, Richmond, VA (US); Mike Garman, Moseley, VA (US); Martin Brady, Manakin Sabot, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 13/523,933

(22) Filed: Jun. 15, 2012

(51) Int. Cl.
*B65D 45/04* (2006.01)
(52) U.S. Cl.
USPC .................. 220/756; 220/318; 220/573.1
(58) Field of Classification Search
USPC .......... 220/317–318, 756, 915.1, 762, 915.2, 220/212.5, 573.1, 592.22, 752, 760; 206/549
See application file for complete search history.

(56) References Cited

U.S. PATENT DOCUMENTS

| | | | |
|---|---|---|---|
| RE3,080 E | 8/1868 | Squire | |
| 148,130 A | 3/1874 | Moore | |
| 192,453 A | 6/1877 | Purdy | |
| 223,013 A | 12/1879 | Shirley et al. | |
| 323,101 A | 7/1885 | Bard | |
| 398,539 A | 2/1889 | Rock | |
| 466,648 A | 1/1892 | Young | |
| 661,050 A * | 11/1900 | Hoffman | 220/263 |
| 862,908 A | 8/1907 | Hawkinson | |
| 899,084 A | 9/1908 | Thoits et al. | |
| 951,916 A | 3/1910 | Leighty | |
| 961,963 A | 6/1910 | Hughes | |
| 1,065,667 A | 6/1913 | Donnell | |
| 1,084,817 A | 1/1914 | Parkinson | |
| 1,204,715 A | 11/1916 | Taylor | |
| 1,207,974 A | 12/1916 | Miller | |
| 1,232,385 A | 7/1917 | Palmer | |
| 1,271,230 A | 7/1918 | Sabo | |
| 1,300,712 A | 4/1919 | Ferdon | |
| 1,336,491 A | 4/1920 | Stern | |
| 1,367,739 A | 2/1921 | Hibbard | |

(Continued)

FOREIGN PATENT DOCUMENTS

EP   0168985   1/1986

OTHER PUBLICATIONS

Toastmaster, Cookin' in Style, Portable Slow Cooker, 2004, 2 pages.

(Continued)

*Primary Examiner* — J. Gregory Pickett
*Assistant Examiner* — Mollie Llewellyn
(74) *Attorney, Agent, or Firm* — Alexander D. Raring

(57) ABSTRACT

A kitchen appliance includes a housing defining a cavity. A heating or cooling element is disposed within the housing. A container is sized and shaped to fit within the cavity. A lid is sized and shaped to at least partially cover an opening of the container. A handle is pivotally mounted to an exterior surface of the side wall of the housing. A first end of the handle is pivotally mounted to the side wall of the housing at a first location. An opposing second end of the handle is pivotally mounted to side wall of the housing at a second location diametrically opposed to the first location. The handle is pivotable between an engaged position which at least a portion of the handle retains the lid in sealing engagement with the container rim and disengage position in which the portion of the handle is spaced-apart from the lid.

4 Claims, 13 Drawing Sheets

(56) References Cited

U.S. PATENT DOCUMENTS

| | | | |
|---|---|---|---|
| 1,410,515 A | 3/1922 | Saddlemire | |
| 1,438,706 A | 12/1922 | Hegenberg | |
| 1,451,545 A | 4/1923 | Ingersoll | |
| 1,472,667 A * | 10/1923 | Nelson | 220/23.88 |
| 1,483,255 A | 2/1924 | Tonge | |
| 1,513,581 A | 3/1924 | Caumont | |
| 1,531,772 A | 3/1925 | Wentorf et al. | |
| 1,698,928 A | 1/1929 | Wentorf et al. | |
| RE17,398 E | 8/1929 | Kircher | |
| 1,765,135 A | 6/1930 | Doland | |
| 1,771,294 A | 7/1930 | Hackett | |
| 1,802,557 A | 4/1931 | Hight | |
| 2,223,432 A | 12/1940 | Smith | |
| D129,108 S | 8/1941 | Sprague | |
| 2,526,050 A | 10/1950 | Schweiso | |
| 2,636,639 A | 4/1953 | Frey | |
| 2,817,552 A | 12/1957 | Bruel | |
| 2,846,257 A | 8/1958 | Sherrill | |
| 2,974,990 A | 3/1961 | Mereness | |
| 3,124,381 A | 3/1964 | Geldart | |
| 3,133,665 A | 5/1964 | Colhouer | |
| 3,140,795 A | 7/1964 | Griffith et al. | |
| 3,174,787 A | 3/1965 | Kolman | |
| 3,291,515 A | 12/1966 | Lierman | |
| 3,363,924 A | 1/1968 | Remig | |
| 3,577,908 A | 5/1971 | Burg | |
| 3,589,760 A | 6/1971 | Williams | |
| 3,635,371 A | 1/1972 | Oxel | |
| 3,674,298 A | 7/1972 | Vekony | |
| 3,746,205 A | 7/1973 | Helguera | |
| 3,746,837 A | 7/1973 | Frey et al. | |
| 3,769,899 A | 11/1973 | Kostko | |
| 3,791,368 A | 2/1974 | Hunt | |
| 4,095,830 A | 6/1978 | Spellman | |
| 4,241,846 A | 12/1980 | Murphy | |
| 4,307,287 A | 12/1981 | Weiss | |
| 4,375,711 A | 3/1983 | Frazen et al. | |
| 4,492,853 A | 1/1985 | Lam | |
| 4,545,501 A | 10/1985 | DeFord | |
| D298,899 S | 12/1988 | Blum et al. | |
| D307,531 S | 5/1990 | Ishida | |
| D313,727 S | 1/1991 | Gamez | |
| 5,046,633 A | 9/1991 | Chung | |
| 5,097,107 A | 3/1992 | Watkins et al. | |
| 5,129,314 A | 7/1992 | Hu | |
| D338,370 S | 8/1993 | Takeda | |
| 5,251,542 A * | 10/1993 | Itoh et al. | 99/403 |
| D341,058 S | 11/1993 | Slany et al. | |
| 5,337,910 A | 8/1994 | Picozza et al. | |
| 5,355,777 A | 10/1994 | Chen et al. | |
| 5,415,082 A | 5/1995 | Nagao | |
| 5,447,252 A * | 9/1995 | Ward | 220/756 |
| D368,620 S | 4/1996 | Piret | |
| D370,826 S | 6/1996 | Thurlow | |
| 5,567,458 A | 10/1996 | Wu | |
| 5,643,481 A | 7/1997 | Brotzki et al. | |
| 5,678,790 A | 10/1997 | Dwyer | |
| 5,687,879 A | 11/1997 | King et al. | |
| D388,657 S | 1/1998 | Bacharowski | |
| 5,715,570 A | 2/1998 | Hyun | |
| 5,786,568 A | 7/1998 | McKinney | |
| 5,829,342 A | 11/1998 | Lee | |
| 5,945,024 A | 8/1999 | Fukunaga et al. | |
| 6,062,130 A | 5/2000 | Brady | |
| 6,102,238 A | 8/2000 | Brady et al. | |
| 6,109,169 A | 8/2000 | Masel et al. | |
| 6,237,765 B1 * | 5/2001 | Hagen et al. | 206/315.11 |
| 6,587,739 B1 | 7/2003 | Abrams | |
| 6,606,987 B2 | 8/2003 | DeMars | |
| 6,772,677 B2 | 8/2004 | Marotel et al. | |
| 6,776,085 B1 | 8/2004 | Tang | |
| D528,353 S | 9/2006 | Brady et al. | |
| 7,140,506 B1 | 11/2006 | Brady et al. | |
| 7,167,642 B1 | 1/2007 | Wagner | |
| 7,485,831 B2 | 2/2009 | Tynes et al. | |
| 7,706,671 B2 | 4/2010 | Brown | |
| 7,717,028 B2 | 5/2010 | Sierra | |
| 7,947,928 B2 | 5/2011 | Tynes et al. | |
| D642,856 S | 8/2011 | Bock et al. | |
| D649,831 S | 12/2011 | Romandy | |
| 8,109,201 B2 | 2/2012 | Schandel et al. | |
| D657,611 S | 4/2012 | Bock | |
| 2002/0073851 A1 | 6/2002 | Chung et al. | |
| 2003/0234205 A1 | 12/2003 | McGuyer et al. | |
| 2005/0145615 A1 | 7/2005 | Schafield et al. | |
| 2008/0084144 A1 | 4/2008 | D'Ambrosio | |
| 2009/0039071 A1 | 2/2009 | Tynes et al. | |
| 2009/0218355 A1 | 9/2009 | Chameroy et al. | |
| 2009/0272279 A1 | 11/2009 | Kieck | |
| 2010/0059460 A1 | 3/2010 | Mulaw | |
| 2011/0061545 A1 | 3/2011 | Foster et al. | |

OTHER PUBLICATIONS

Brian Krepshaw, Back to Work Gets Tastier, Crock-Pot SCCPLC2w00-G Lunch Crock Food Warmer, Jan. 3, 2012, 2 pages.

Ella Grace, Inc., SecureLid™ Product Description and Key Features, 2004, 2 pages.

* cited by examiner

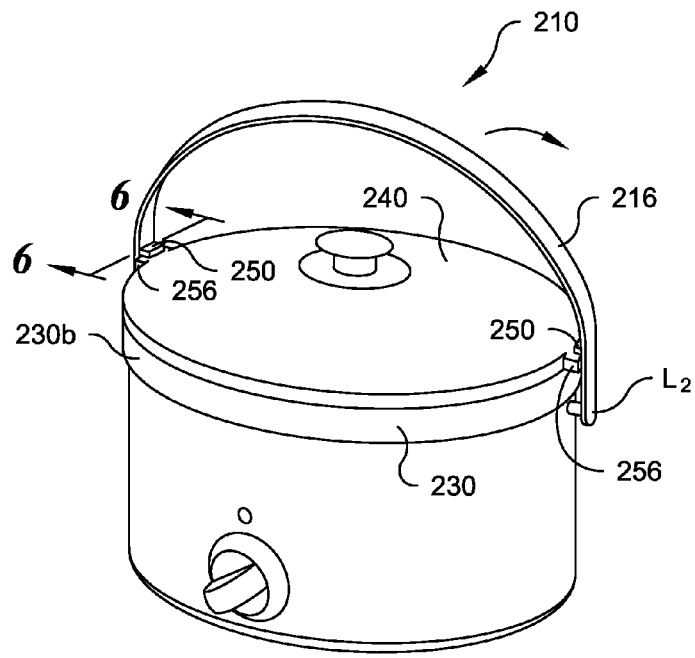
*Fig. 5*
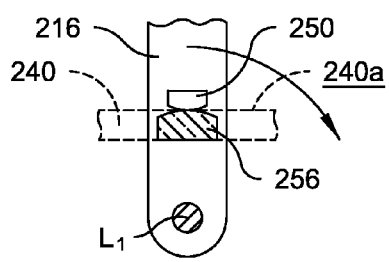
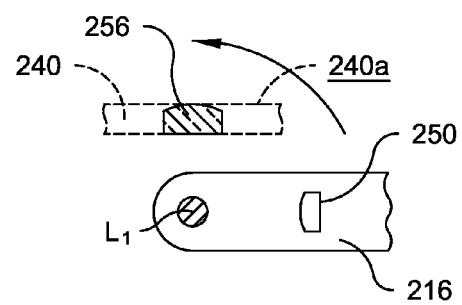
*Fig. 6A*  *Fig. 6B*

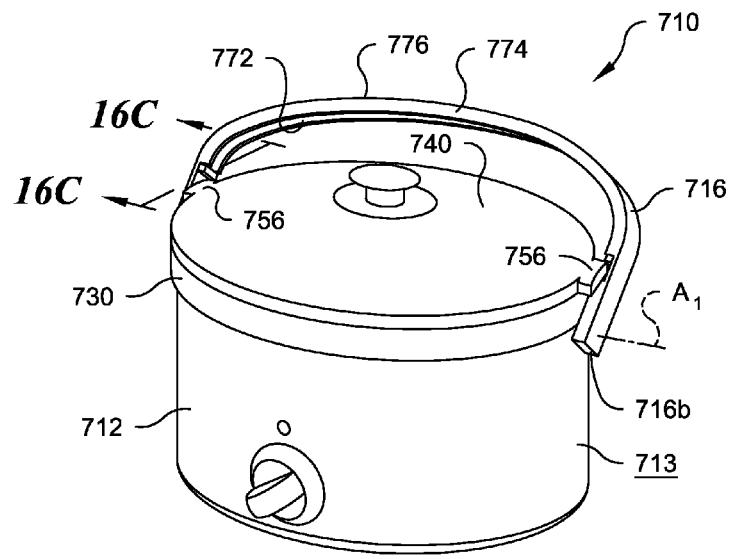
*Fig. 15*
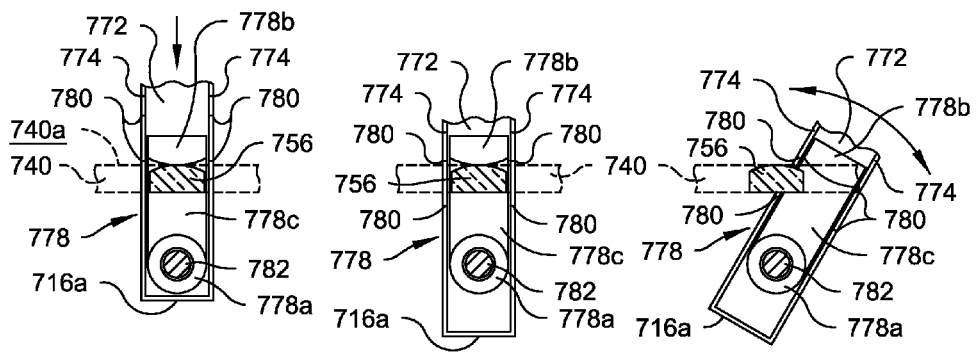
*Fig. 16A*   *Fig. 16B*   *Fig. 16C*

KITCHEN APPLIANCE AND METHOD OF USING SAME

BACKGROUND OF THE DISCLOSURE

The present disclosure relates generally to a kitchen appliance and, more particularly, to a slow cooker that can be easily transported with little or no spillage of any contents therein.

Kitchen appliances, and particularly slow cookers, are well known. Conventional slow cookers are generally sized and shaped to allow a user to pick-up and move or transport the slow cooker from one location to another. Often, the user may want to move the slow cooker after it is loaded with contents, such as foodstuff to be cooked and/or other contents to be heated.

However, it can be difficult to move or transport conventional slow cookers when foodstuff, particularly liquid, has been placed therein without spilling some of the foodstuff. The components of conventional slow cookers are not made to close tolerances, and any lid of a conventional slow cooker is typically not securely engaged with a container of the slow cooker when in a closed position. This creates a potential for the lid to inadvertently slide off the container when the slow cooker is being carried from one location to another. Also, because the lid is not usually engaged with a tight fit and because foodstuff cooked in a slow cooker, such as soup, chili, stew, etc., typically has a significant liquid content, there exists the potential of significant spillage if the slow cooker is tilted during transport.

It has heretofore not been discovered how to make the engagement and sealing of the lid to the container of a slow cooker simpler and more user friendly. The device of the present disclosure overcomes and/or eliminates at least one of the above or other shortcomings of conventional appliances.

BRIEF SUMMARY OF THE DISCLOSURE

Briefly stated, a preferred embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. The housing has a major axis and a minor axis extending generally perpendicularly thereto. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. The lid has an exterior surface and an opposing interior surface facing the interior of the container when the lid is placed on the container. A handle is pivotally mounted to the exterior surface of the side wall of the housing. A first end of the handle is pivotally mounted to the exterior surface of the side wall of the housing at a first location along the major axis of the housing. An opposing second end of the handle is pivotally mounted to the exterior surface of the side wall of the housing at a second location along the major axis opposed to the first location. The handle is pivotable between an engaged position which at least a portion of the handle contacts at least a portion of the lid to retain the lid in sealing engagement with the container rim to inhibit linkage of the contents from the interior of the container and disengage position in which the portion of the handle is spaced-apart from the lid to permit the lid to be removed from the container rim.

In another aspect, a preferred embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. The lid has an exterior surface and an opposing interior surface facing the interior of the container when the lid is placed on the container. A handle is pivotally mounted to the exterior of the side wall of the housing. The handle includes a first half and a second half. The first half is separable from the second half. A first end of each half is pivotally mounted to the exterior surface of the side wall of the housing at a first location and an opposing second end of each half is pivotally mounted to the exterior surface of the side wall of housing at a second location generally opposite to the first location. Each of the first and second halves of the handle are pivotable between an engaged position in which at least a portion of each half contacts at least a portion of the lid to retain in sealing engagement with the container rim to inhibit linkage of the contents from the interior of the container and a disengaged position in which the portion of each half is spaced-apart from the lid to prevent the lid to be removed from the container rim.

In yet another aspect, a preferred embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. A handle is pivotally mounted to the exterior surface of the side wall of the housing. A first end of the handle is pivotally mounted to the exterior surface of the side wall of the housing at a first location and an opposing second end of the handle is pivotally mounted to the exterior surface of the side wall of the housing at a second location diametrically opposed to the first location. The handle is pivotable between an engaged position in which at least a portion of the handle contacts at least a portion of the lid to retain the lid in sealing engagement with the container rim to inhibit leakage of the contents from the interior of the container and a disengaged position in which the portion of the handle is spaced-apart from the lid to permit the lid to be removed from the container rim. A biasing member is engaged with at least a portion of the handle for biasing the handle toward the lid in the engaged position.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the invention is not limited to the precise arrangements and instrumentalities shown. In the drawings:

FIG. 5 is a top front perspective view of the kitchen appliance according to a third preferred embodiment of the present disclosure, wherein the handle is in the engaged position;

FIG. 6A is an enlarged cross-sectional elevational view taken along line 6-6 of FIG. 5 when the handle is in the engaged position;

FIG. 6B is an enlarged cross-sectional elevational view taken along line 6-6 of FIG. 5 when the handle is in the disengaged position;

FIG. 15 is a top front perspective view thereof, wherein the handle is shown in the disengaged position and the unlocked position;

FIG. 16A is an enlarged cross-sectional elevational view taken along line 16A-16A of FIG. 13;

FIG. 16B is an enlarged cross-sectional elevational view taken along line 16B-16B of FIG. 14;

FIG. 16C is an enlarged cross-sectional elevational view taken along line 16C-16C of FIG. 15;

DETAILED DESCRIPTION OF THE DISCLOSURE

Figure 1:
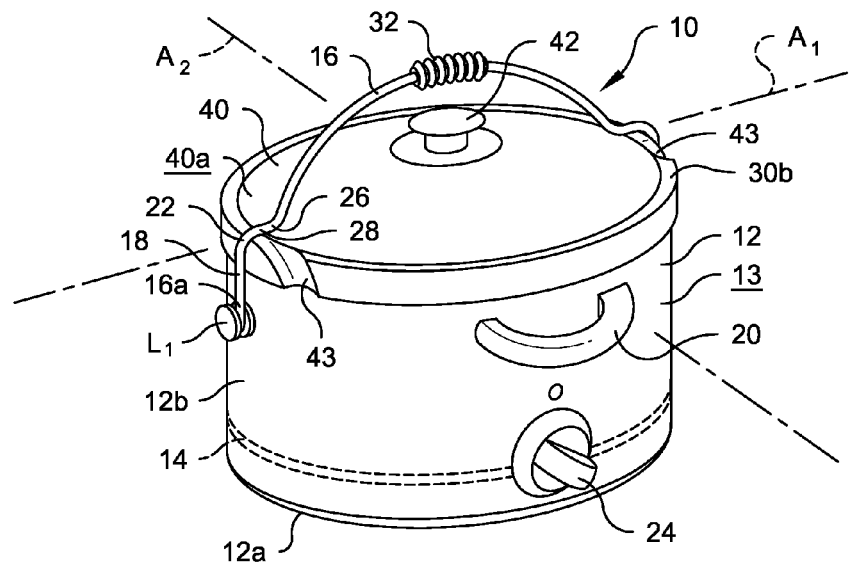
FIG. 1 is a top front perspective view of a kitchen appliance according to a first preferred embodiment of the present disclosure, wherein a handle is in an engaged position.

Certain terminology is used in the following description for convenience only and is not limiting. The words "lower," "bottom," "upper" and "top" designate directions in the drawings to which reference is made. The words "inwardly" and "outwardly" refer to directions toward and away from, respectively, the geometric center of the kitchen appliance, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 2:
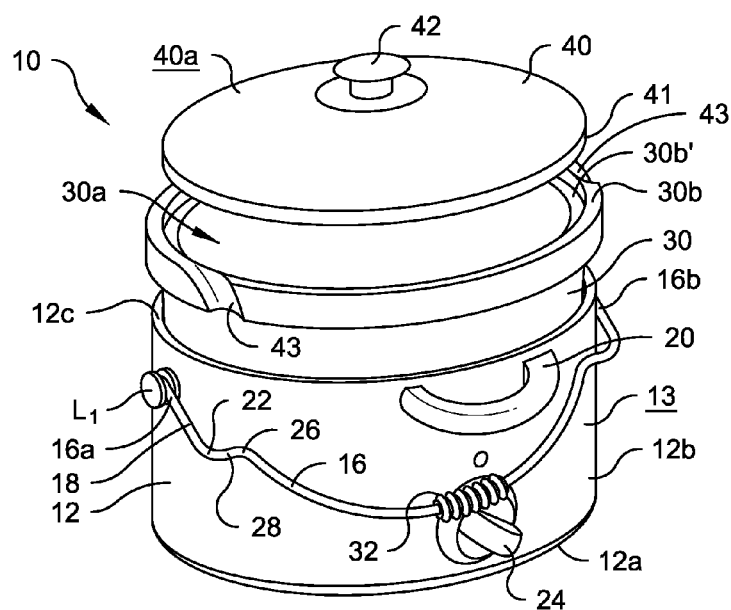
FIG. 2 is a partially exploded top front perspective view thereof, wherein the handle is in an disengaged position.

Referring to the drawings in detail, wherein like numerals indicate like elements throughout, FIGS. 1 and 2 show a kitchen appliance, generally designated 10, according to a first preferred embodiment of the present disclosure. The kitchen appliance 10 is illustrated as a slow cooker for warming and/or cooking (collectively referred to as heating) contents (none shown), such as foodstuff or another object, therein. However, the present disclosure is not limited to such a device or functionality. For example, the kitchen appliance 10 may be any of a variety of devices typically used in a kitchen, such as a deep fryer, roaster oven, or the like. In fact, the kitchen appliance 10 could be any type of device having a lid and a container, as described in detail below. The term "foodstuff," as used herein, is sufficiently broad to cover any substance that is capable of being consumed by a user, such as a pork roast, vegetables, water, milk or the like, or any combination thereof. The kitchen appliance 10 is also capable of heating or cooling one or more objects (not shown) other than foodstuff, such as a baby's bottle, one or more stones or towels for a massage, or the like.

Referring to FIGS. 1 and 2, the kitchen appliance 10 includes a housing 12 having a base 12a and a side wall 12b extending therefrom. The side wall 12b preferably extends at least generally perpendicularly to the base 12a. The side wall 12b includes an exterior surface 13 that faces and/or is exposed to the external environment and an opposing interior surface (not shown). At least portions of the interior surface of the side wall 12b and an interior or upper surface of the base 12a surround and/or define a cavity of the housing 12. As shown in FIG. 2, the housing 12 also includes a housing rim 12c at an upper free edge of the side wall 12b. The housing rim 12c surrounds and/or defines an opening to the cavity of the housing 12.

Preferably, the base 12a, the side wall 12b and the housing rim 12c are generally ovular or elliptical in shape when viewed from above or below. Thus, the housing 12 preferably has a major axis $A_1$ and a minor axis $A_2$ extending generally, but preferably exactly, perpendicularly thereto. While the ovular or elliptical shape is preferred, the base 12a may have a different shape, such as, but not limited to, circular or rectangular in plan view. The base 12a may include several generally spaced-apart, rounded protrusions or feet (not shown) extending downwardly from a bottom surface thereof for supporting the kitchen appliance 10 on a support surface (not shown), such as a countertop, and spacing the bottom surface of the base 12a at least slightly above the support surface. Alternatively, the kitchen appliance 10 may include no feet, such that the kitchen appliance 10 is supported by the bottom surface of the base 12a directly on the support surface. The side wall 12b may include two equidistantly spaced-apart housing handles 20 (only one shown in the present embodiment, but two are shown and described in the seventh preferred embodiment of FIGS. 11 and 12) that extend outwardly from the exterior surface 13. Each handle 20 preferably extends outwardly from the side wall 12b of the housing 12 below the housing rim 12c. Each handle 20 may be vertically aligned with the control knob 24. However, the handles 20 are not limited to such a size, shape, configuration or location, as the handles 20 may be positioned anywhere on the housing 12 that provides the intended functionality allowing the kitchen appliance 10 to be quickly and easily lifted and/or transported.

Referring specifically to FIG. 1, a heating or cooling element 14 (shown in phantom) is preferably disposed within the housing 12 proximate the cavity to heat and/or cool the cavity. The heating or cooling element 14 may be located within or on the interior surface of the side wall 12b of the housing 12, or may be disposed within the base 12a of the housing 12 in addition to or instead of the side wall 12b. The heating or cooling element 14 may be electrically powered and is preferably a resistance-type heating element, such as a calrod or mica board heating element. However, a different type of heating or cooling element may be used, provided the heating or cooling element functions to heat and/or cool the cavity of the housing 12.

A control knob 24 preferably extends outwardly from the side wall 12b of the housing 12 to enable a user to control the heating or cooling element 14. Thus, the control knob 24 is preferably operatively connected to the heating or cooling element 14. It is preferred that rotation of the knob 24 by a user toggles the heating or cooling element 14 between at least one "on" setting and an "off" setting. It is further preferred that the heating or cooling element 14 have at least two "on" settings, specifically a "high" heat setting and a "low" heat setting. Although two heat settings are preferred, it is further contemplated that alternate configurations may be used, such as, but not limited to, rotation of the knob 24 actuating a thermostat (not shown) to cause the heating or cooling element 14 to heat and/or cool the cavity of the housing 12 to a specific user selected temperature. The kitchen appliance 10 is not limited to the size, shape, configuration and/or functionality of the control knob 24 shown and described herein. Instead, the kitchen appliance 10 may have a control interface (not shown), with one or more buttons, switches or the like, in addition to or in place of the control knob 24.

Referring to FIGS. 1 and 2, the kitchen appliance 10 preferably includes a container 30 sized and/or shaped to fit within the cavity of the housing 12 for heating and/or cooling thereof by the heating or cooling element 14. More specifically, an exterior of the container 30 is preferably at least slightly smaller than the interior of the cavity of the housing 12, such that at least a majority of the container 30 fits within the cavity of the housing 12. The container 30 is preferably made of stoneware or ceramic. However, the container 30 may be made of a different material, such as cast iron with a porcelain enamel coating, for instance, provided the container 30 is capable of functioning as described herein. Additionally, it is preferable that the container 30 be easily removable from the housing 12 to facilitate cleaning thereof without exposing the housing 12, and specifically the heating or cooling element 14 and other electrical components thereof, to water and/or cleaning detergents or solvents.

The container 30 preferably includes a generally hollow interior 30a (see FIG. 2) and a container rim 30b defining an opening for accessing the interior 30a. The interior 30a of the container 30 is capable of retaining the contents therein. The phrase "container rim," as used herein, may simply be a top or upper-most horizontal edge of a side wall of the container 30. Additionally and/or alternatively, the phrase "container rim" may be at least a portion of a ledge 30b' (see FIG. 2) spaced inwardly and at least slightly downwardly from the upper-most horizontal edge of the side wall of the container 30.

Referring to again FIGS. 1 and 2, the kitchen appliance 10 preferably includes a lid 40 sized and shaped to at least partially and preferably completely cover the opening of the container 30 when the lid 40 is placed on or adjacent to the container rim 30b. The lid 40 includes a top or exterior surface 40a and an opposing bottom or interior surface (not shown) that faces the interior 30a of the container 30 when the lid 40 is placed on or adjacent to the container rim 30b. A lid handle 42 preferably extends outwardly or upwardly from the exterior surface 40a of the lid 40. Preferably, the lid 40 has at least a slightly arcuate shape, such that the exterior surface 40a is generally convex and the interior surface is generally concave. Alternatively, at least one or both of the exterior surface 40a and the interior surface of the lid 40 may be at least partially or entirely flat. The lid 40 is preferably predominantly made of glass, although the lid 40 may be made of a different, preferably transparent or translucent material, such as a polymeric material, for instance, provided the lid 40 functions as described herein.

The lid 40 is preferably generally ovular or elliptical when viewed from above or below to correspond to or at least generally match the shape of the opening of the container 30. Preferably, when placed on the container rim 30b, the lid 40 covers the entire opening of the container 30 such that an entire outer periphery of the lid 40 engages and/or is placed adjacent to the container rim 30b. The lid 40 is shown herein to have an outer periphery and a diameter that is at least slightly smaller than an outer periphery and a diameter of the container rim 30b, because at least a portion of the outer periphery of the lid 40 rests on the ledge 30b' (see FIG. 2) at least slightly inwardly from the outer periphery of the container 30. However, in an alternative embodiment, such as that shown in FIG. 5 of the third preferred embodiment described in detail below, the outer periphery of the lid 40 may match or be about the same size as or slightly smaller than the outer periphery of the container 30.

Referring to FIG. 2, a gasket 41 preferably extends around and/or below one of the outer periphery or edge of the lid 40 and the container rim 30b for sealing the lid 40 to the container 30. More specifically, when the lid 40 is removed from the container 30, the gasket 41 may extend around and/or be attached to the outer edge or periphery of the lid 40 or the interior surface of the lid 40 proximate the outer edge thereof. Alternatively, the gasket 41 may be extend around and/or be attached to the container rim 30b. The gasket 41 is preferably formed of a resiliently flexible material, such as an elastomeric or rubber material. The gasket 41 may be identical to that disclosed in U.S. Pat. No. 7,947,928, which is herein incorporated by reference in its entirety. However, instead of a circular or ovular cross-sectional shape, the gasket 41 may has a Z or zig-zag shape. Regardless or the cross-sectional shape of the gasket 41, the gasket 41 is preferably at least slightly compressible to create at least a liquid-tight seal between the lid 40 and the container rim 30b when the lid 40 is properly placed on the container 30.

Referring again to FIGS. 1 and 2, the kitchen appliance 10 includes at least one handle 16 pivotally mounted to the outermost portion of the exterior surface 13 of the side wall 12b of the housing 12. Thus, the handle 16, including an inner surface thereof, preferably extends radially outwardly beyond the exterior surface 13 of the side wall 12b of the housing 12. The handle 16, which may be referred to as a bail handle, includes a first end 16a and an opposing second end 16b. A gripping member 32 may be positioned equidistantly between the first and second ends 16a, 16b of the handle 16. The first end 16a of the handle 16 is preferably pivotally mounted to the exterior surface 13 of the side wall 12b of the housing 12 at a first location $L_1$ along the major axis $A_1$ of the housing 12. The second end 16b of the handle 16 is preferably pivotally mounted to the exterior surface 13 of the side wall 12b of the housing at a second location $L_2$ (not shown in FIGS. 1 and 2, but shown in the figures of other embodiments) along the major axis $A_1$ of the housing 12 diametrically opposed to the first location $L_1$. However, the handle 16 is not limited to extending along or parallel to the major axis $A_1$ of the housing 12, as the handle 16 may extend along or parallel to the minor axis $A_2$ of the housing 12, or at a location therebetween. The handle 16 may be one, continuous element that extends uninterrupted or continuously from the first end 16a to the second end 16b. Alternatively, the handle 16 may be formed of two separate and spaced-apart elements, one of which is located proximate to the first end 16a and the other of which is located proximate to the second end 16b.

As shown in FIGS. 1 and 2, the handle 16 is preferably at least slightly or partially arcuate in shape. More specifically, the handle 16 preferably includes a first generally straight portion 18 extending from the first end 16a thereof. A first arcuate portion 22 of the handle 16 preferably extends directly from the first generally straight portion 18 opposite the first end 16a. A second generally straight portion 28 of the handle 16 preferably extends directly from the first arcuate portion 22 opposite the first generally straight portion 18. A second arcuate portion 26 of the handle 16 preferably extends indirectly from the first arcuate portion 22 thereof and directly from the second generally straight portion 28. The first arcuate portion 22 is preferably generally convex with respect to the housing 12 and has a first radius of curvature. The second arcuate portion 26 is preferably generally concave with respect to the housing 12 and has a second radius of curvature. The first and second radii of curvature may be generally or exactly equal, or the second radius of curvature of the second arcuate portion 26 may be greater than the first radius of curvature of the first arcuate portion 22. The shape of the handle 16 proximate the first end 16a is preferably duplicated or mirrored proximate the second end 16b, such that the handle 16 includes the above-described generally straight and arcuate portions 18, 28, 22, 26 in the same configuration proximate the second end 16b of the handle 16.

The handle 16 is preferably pivotable from a position in which the handle 16 is out of the way or does not inhibit removal of the lid 40 and/or the container 30 from the housing 12 (FIG. 2) to a position in which the handle 16 permits a user to easily and quickly transport the entire kitchen appliance 10 (FIG. 1). More specifically, the handle 16 is preferably pivotable between an engaged or raised position (FIG. 1) and a disengaged or lowered position (FIG. 2). In the engaged position, at least a portion of the handle 16 preferably directly contacts (i.e., interference) at least a portion of the lid 40 to retain the lid 40 (specifically the gasket 41) in sealing engagement with the container rim 30b to inhibit leakage of the contents from the interior 30a of the container 30. It is preferred that the gripping member 32 and/or a midportion of the handle 16 is preferably spaced a predetermined distance above the lid handle 42 when the handle 16 is in the fully engaged position (see FIG. 1). In the disengaged position, the portion of the handle 16 that contacts the lid 40 in the engaged position is spaced-apart from the lid 40 to permit the lid 40 to be removed from the container rim 30b. In use, it is preferred that the handle 16 is pivotable from one side of the housing 12, up and over the top of the housing 12 to the opposing side of the housing 12. More specifically, the entire handle 16 is pivotable from a first position (FIG. 2) in which at least a portion of the handle 16 contacts the exterior surface 13 of the side wall 12b of the housing 12 on one side thereof, up and over the lid 40 to a second position in which at least a portion of the handle 16 contacts the exterior surface 13 of the side wall 12b of the housing 12 at another or opposite side thereof. The first position and second positions of the handle 16 described herein are each a specific example of the disengaged position of the handle 16.

The portion of the handle 16 that preferably directly engages or contacts the exterior surface 40a of the lid 40 in the engaged position is preferably at least a portion of one of the first second portion 22, the second arcuate portion 26 and the second generally straight portion 28. More specifically, it is preferred that a portion of each of the first second portion 22, the second arcuate portion 26 and the second generally straight portion 28 directly contacts the exterior surface 40a of the lid 40 in the engaged position of the handle 16. In a preferred embodiment, at least a portion of each of the two second arcuate portions 26 of the handle 16 directly engages the exterior surface 40a of the lid 40 when the handle 16 is in the engaged position. When the handle 16 is in the engaged position (FIG. 1), at least a portion of the lid 40 and the container rim 30b cooperate and/or combine to at least partially compress the gasket 41 therebetween, which forms a tight seal between the lid 40 and the container 30. Unless and until the handle 16 is moved out of the engaged position, the handle 16 provides the force necessary to at least partially compress the gasket 41. As a result of the handle 16, the lid 40 may be latched or unlatched (i.e., sealed or unsealed) to the container 30 in one motion.

At least one and preferably two spaced-apart or diametrically opposed channels 43 are formed in at least a portion of the housing rim 12c and/or the container rim 30b. Each channel 42 is preferably concave with respect to the exterior surface 13 of the side wall 12b of the housing 12 and is preferably at least slightly arcuate in shape. Each channel 42 is preferably sized, shaped and/or configured to generally match the path of motion of the handle 16 between the engaged or raised position (FIG. 1) and the disengaged or lowered position (FIG. 2). In essence, it is preferred that the channels 42 allow for the desired movement of the handle 16. More particularly, at least a portion of the second arcuate portion 26 and/or the second generally straight portion 28 pass through and/or extend into at least a portion of the channel(s) 42 when the handle 16 is pivoted. Alternatively or addition, the handle 16 may be formed of a material having a certain degree of flexibility and/or resiliency. In such an embodiment, the channel (s) 42 may not be necessary, because the handle 16 could adjust to and compensate for any interference caused by the housing rim 12c and/or the container rim 30b when the handle 16 is moved between the engaged or raised position (FIG. 1) and a disengaged or lowered position (FIG. 2). In other words, at least a portion of the handle 16 could at least slightly flex or bend (i.e., upwardly and/or outwardly) around the housing rim 12c and/or the container rim 30b when the handle 16 is pivoted.

Figure 3:
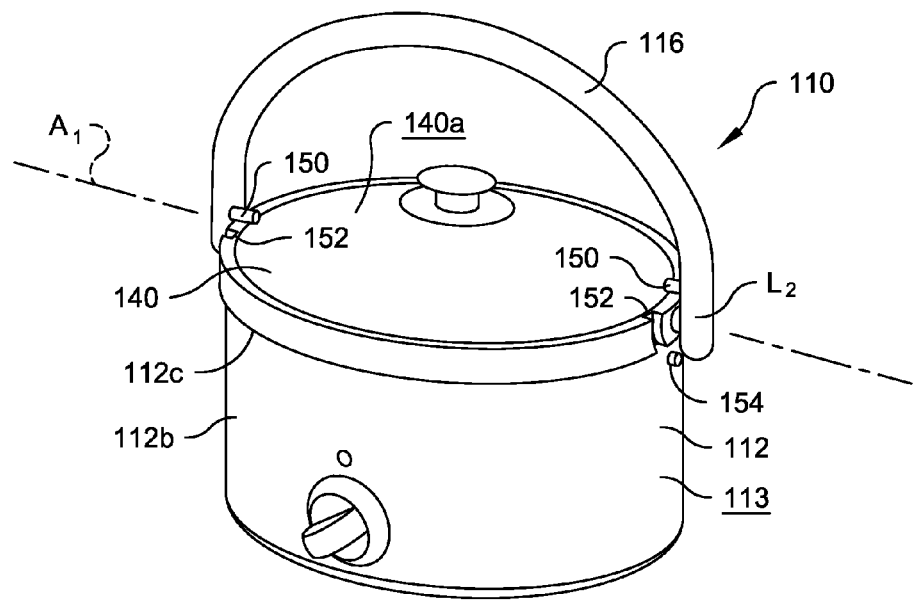
FIG. 3 is a top front perspective view of the kitchen appliance according to a second preferred embodiment of the present disclosure, wherein the handle is in the engaged position.
Figure 4:
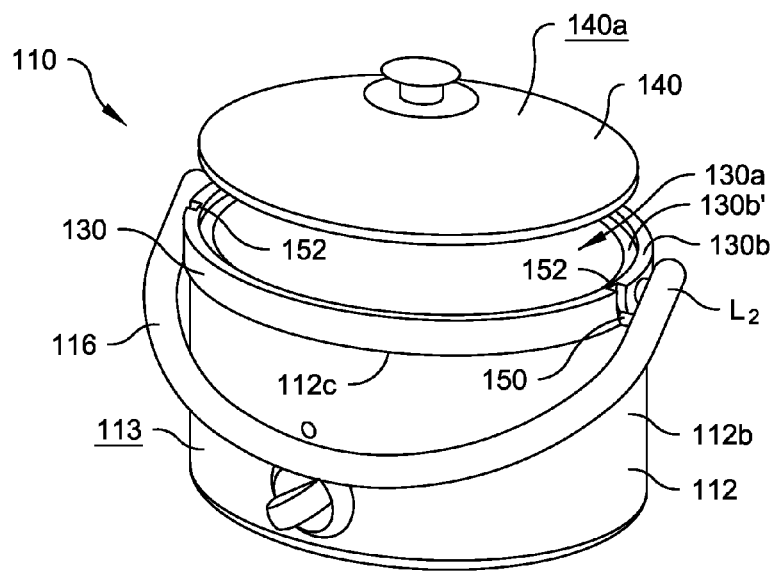
FIG. 4 is a partially exploded top front perspective view thereof, wherein the handle is in the disengaged position.

FIGS. 3 and 4 show a second preferred embodiment of the kitchen appliance 110. The reference numerals of the second preferred embodiment are distinguishable from those of the first preferred embodiment by a factor of one-hundred (100), but otherwise indicate the same elements as indicated in the first preferred embodiment, except as otherwise specified. The kitchen appliance 110 of the second preferred embodiment is substantially similar to that of the first preferred embodiment. The description of certain similarities between the embodiments may be omitted herein for the sake of brevity and convenience, and, therefore, is not limiting.

The handle 116 of the second preferred embodiment has a simpler, more consistently arcuate shape than the handle 16 of the first preferred embodiment. Further, the handle 116 includes at least one and preferably two-spaced apart projections 150. Each projection 150 preferably extends inwardly from an inner surface of the handle 116 toward the cavity of the housing 112. Each projection 150 is preferably fixed with respect to the handle 116. The projections 150 are shown herein as being in the shape of a cylindrical member or lug, but the projections 150 may have any sized and/or shape that permits the functionality described herein. It is preferred that at least a lower surface or periphery of each projection 150 extends radially inwardly so as to be at least generally, if not exactly, parallel to a top surface of the rim 130b of the container 130. However, at least a portion of each projection 150 may extend at an angle with respect to the top surface of the rim 130b of the container 130.

As shown in FIG. 3, when the handle 116 is in the engaged or raised position, at least a portion of at least one of the projections 150, and preferably portions of both projections 150, directly contacts at least a portion of the exterior surface 140a of the lid 140. Such direct contact preferably creates a sealing engagement between the lid 140 and the container 130 by at least partially compressing the gasket (not shown) therebetween. In order to directly contact the exterior surface 140a of the lid 140, each projection 150 is preferably positioned entirely above the housing rim 112c in the engaged position of the handle 116 (see FIG. 3). However, in the disengaged or lower position of the handle 116, each projection 150 is preferably positioned entirely below the housing rim 112c (see FIG. 4). In a preferred embodiment in which an outer periphery of the lid 140 is at least slightly smaller than an outer periphery of the container 130 such that the lid 140 rests on the ledge 130b' spaced at least slightly laterally inwardly from the outer periphery of the container 130 (see FIGS. 3 and 4), each projection 150 has a length that is preferably at least slightly greater than a thickness of the container 130. The greater length of each projection 150, as compared to the thickness of the container 130, allows each projection 150 to extend from the inner surface of the handle 116 to a portion of the lid 140 inwardly of the outer periphery thereof.

As shown in FIGS. 3 and 4, at least a portion of the container 130 includes at least one and preferably two spaced-apart grooves 152 in an upper portion thereof. More specifically, each groove 152 preferably corresponds to each projection 150 of the handle 116, and each groove 152 is preferably sized, shaped and/or position on the container 130 such that at least a portion of one of the projections 150 can pass therethrough when the handle 116 is moved between the engaged or raised position (FIG. 3) and the disengaged or lowered position (FIG. 4). Each groove 152 is preferably positioned within the container 130 proximate the container rim 130b, and each groove 152 preferably extends at least slightly inwardly toward the interior 130a of the container 130. Each groove 152 is also preferably at least slightly arcuate or curved to allow for the arcuate or curved range of motion of each projection 150 as the handle 116 is moved or pivoted between the engaged and disengaged positions. It is preferred that each groove 152 is on the same side of the major axis A1 of the housing 112.

As shown in FIG. 3, as least one and preferably two spaced-apart stops 154 are positioned on the exterior surface 113 of the side wall 112b of the housing 112. In the preferred embodiment, each stop 154 preferably extends at least slightly outwardly from the exterior surface 113 of the side wall 112b of the housing 112 at least slightly below the housing rim 112c. The at least one stop 154 is preferably sized and/or shaped to engaged and/or directly contact at least a portion of one of the projections 150 of the handle 116 when the handle 116 is in the disengaged position. The at least one stop 154 preferably limits the rotation of the handle 116 with respect to the housing 112 and the container 130.

As an alternative to the above described configuration, the projection(s) 150 and groove(s) 152 may be reversed. For example, the inner surface of the handle 116 may include the at least one and more preferably two-spaced-apart grooves 152 extending outwardly, away from the cavity of the housing 112 and into an interior of the handle 116. In such an alternative embodiment, the lid 140 preferably includes the at least one and more preferably two-spaced apart projections 150, which would outwardly beyond the outer edge of the lid 140. At least a portion of each projection 150 would preferably be positioned at least partially within one of the grooves 152 when the handle 116 is in the engaged position.

FIGS. 5-6B show a third preferred embodiment of the kitchen appliance 210. The reference numerals of the third preferred embodiment are distinguishable from those of the first preferred embodiment by a factor of two-hundred (200), but otherwise indicate the same elements as indicated in the first preferred embodiment, except as otherwise specified. The kitchen appliance 210 of the third preferred embodiment is substantially similar to the first and second preferred embodiments described above. The description of certain similarities between the embodiments may be omitted herein for the sake of brevity and convenience, and, therefore, is not limiting.

A distinguishing feature of the third preferred embodiment is at least one and preferably two-equidistantly spaced-apart tabs 256 extend outwardly beyond the outer periphery of the lid 240. In the third preferred embodiment shown in FIG. 5, the outer periphery of the lid 240 matches or is identical in size and shape to the outer periphery of the container rim 230b, such that at least a portion of the outer periphery of the lid 240 can rest directly on a top surface of the container rim 230b. As shown in FIGS. 6A and 6B, a top surface of each tab 256 is preferably at least slightly arcuate, curved and/or convex in shape. However, the top surface of each tab 256 is not limited to such a configuration, as the top surface of each tab 256 may be generally flat or planar, or even at least slightly concave. At least a portion of the top surface of each tab 256 is preferably generally coplanar with the exterior surface 240a of the lid 240. When the handle 216 is in the engaged position, a bottom surface of each projection 250 preferably directly engages and/or contacts at least a portion of the top surface of one of the tabs 256. Engagement of the bottom surface of at least one of the projections 250 with at least a portion of the top surface of one of the tabs 256 creates a sealing engagement between the lid 240 and the container 230 by at least partially compressing the gasket (not shown) therebetween. Such an engagement preferably prevents removal of the lid 240 from the container 230 and preferably prevents leakage of the contents from within the interior of the container 230.

In contrast to the second preferred embodiment described above, the handle 216 of the third preferred embodiment is preferably rotatable between the engaged position (FIGS. 5 and 6A) and the disengaged position (FIG. 6B) in either a first rotational direction (i.e., clockwise) or an opposing second rotational direction (i.e., counterclockwise). In other words, in the third preferred embodiment, when the handle 216 is in the engaged position shown in FIG. 6A, the handle 216 may be rotated either clockwise or counterclockwise to place the handle 216 in the disengaged position to allow the lid 240 to be removed from the container 230.

Figure 6C:
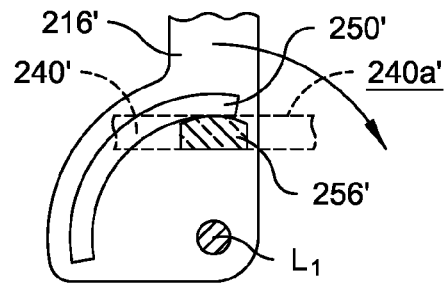
FIG. 6C is an enlarged cross-sectional elevational view of a portion of the kitchen appliance according to a modified version of the third preferred embodiment of the present disclosure, wherein the handle is in a first locked position.
Figure 6D:
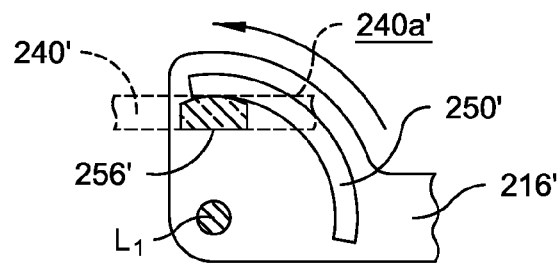
FIG. 6D is an enlarged cross-sectional elevational view of a portion of the kitchen appliance according to a modified version of the third preferred embodiment of the present disclosure, wherein the handle is in a second locked position.
Figure 6E:
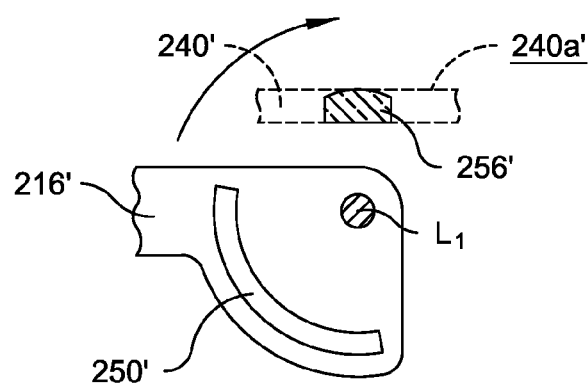
FIG. 6E is an enlarged cross-sectional elevational view of a portion of the kitchen appliance according to a modified version of the third preferred embodiment of the present disclosure, wherein the handle is in unlocked position.

FIGS. 6C-6E show a modified version of the third preferred embodiment. The reference numerals of the modified version of the third preferred embodiment are distinguishable from those of the third preferred embodiment by a prime symbol ('), but otherwise indicate the same elements as indicated in the third preferred embodiment, except as otherwise specified. The kitchen appliance of the modified version of the third preferred embodiment is substantially similar to the preferred embodiments described above. The description of certain similarities between the embodiments may be omitted herein for the sake of brevity and convenience, and, therefore, is not limiting.

A distinguishing feature of the modified version of the third preferred embodiment is that the handle 216' includes at least one and possibly two spaced-apart projections 250' extending inwardly therefrom. Although two projections 250' may be included on the handle 216', FIGS. 6C-6E show only a single projection 250' for simplicity and brevity, and, therefore, is not limiting. The handle 216' preferably includes at least a first locked position (FIG. 6C), an opposing second locked position (FIG. 6D) rotationally spaced-apart from the first locked position, and an unlocked position (FIG. 6E) rotationally spaced-apart from each of the first and second locked positions. In both the first and second locked positions, at least a portion of the projection 250' preferably directly engages or contacts at least a portion of the top surface of one of the tabs 256' of the lid 240'. The lid 240' may be sealed and/or locked onto the container (not shown, but see container 30 in FIG. 2 of the first preferred embodiment) when the handle 216' is at any rotational position between those shown in FIGS. 6C and 6D. In the unlocked position, the projection 250' is preferably spaced-apart from and does not contact or engage either of the tabs 256' of the lid 240'. The handle 216' may include more than the one unlocked position shown in FIG. 6E. For example, the handle 216' may have an unlocked position by continuing to rotate the handle 216' in a clockwise direction in FIG. 6D until the projection 250' completely passes over and is spaced-apart from the tab 256' of the lid 240'.

As shown in FIGS. 6C-6E, the projection 250' is preferably arcuate or curved in shape and is positioned at or within an enlarged, lower portion of the handle 216'. An inner or lower surface of the projection 250', which preferably contacts at least a portion of a top surface one of the tabs 256' of the lid 240', is preferably sized and/or shaped to complement the size and/or shape of the top surface of one of the tabs 256'. In either the first or second locked positions (see FIGS. 6C and 6D), the tab 256' of the lid 240' is preferably positioned between at least a portion of the projection 250' and the first location $L_1$ of the housing (not shown). Although at least a portion of the top surface of the tab 256' is shown as being level or coplanar with the top surface 240a' of the lid 240', the tab 256' is not limited to such a configuration, as the tab 256' may be positioned at least slightly above or below the top surface 240a' of the lid 240'.

Figure 7:
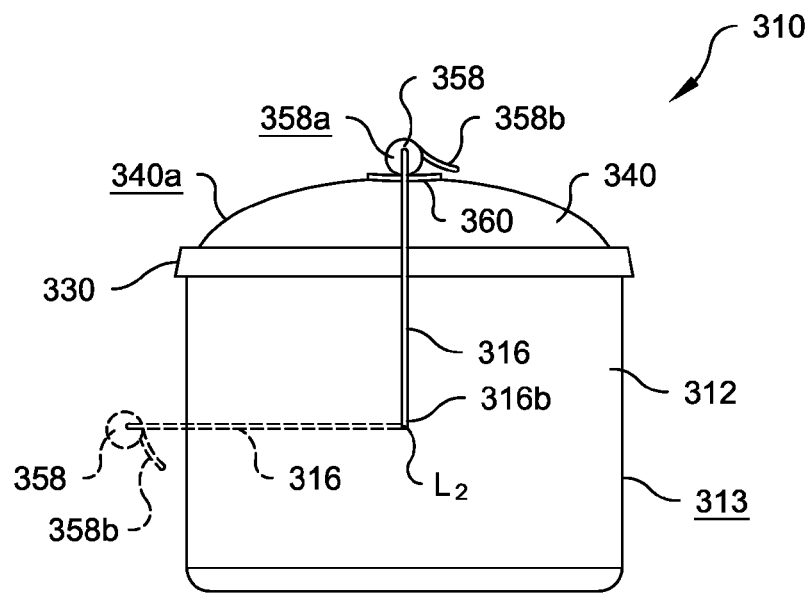
FIG. 7 is a side elevational view of the kitchen appliance according to a fourth preferred embodiment of the present disclosure, wherein the handle is shown in the engaged position in solid lines and the handle is shown in the disengaged position in broken lines.

FIG. 7 shows a fourth preferred embodiment of the kitchen appliance 310. The reference numerals of the fourth preferred embodiment are distinguishable from those of the first preferred embodiment by a factor of three-hundred (300), but otherwise indicate the same elements as indicated in the first preferred embodiment, except as otherwise specified. At least certain portions of the kitchen appliance 310 of the fourth preferred embodiment, such as the housing 312 and the container 330, are substantially similar to that of the first through third preferred embodiments described above. The description of certain similarities between the embodiments may be omitted herein for the sake of brevity and convenience, and, therefore, is not limiting.

A distinguishing feature of the kitchen appliance 310 of the fourth preferred embodiment is that the handle 316 preferably includes a cam 358. The cam 358 is preferably rotatable with respect to or about with the handle 316 in a first rotational direction (i.e., clockwise) and/or a second rotational direction (i.e., counterclockwise). The cam 358 is preferably positioned at an approximate midpoint of the handle 316 between the first end (not shown) at the first location (not shown) and the second end 316b at the second location $L_2$. The cam 358 preferably includes at least a partially cylindrical or circular outer surface 358a, and may include a handle 358b extending outwardly therefrom that allows a user to selectively manipulate the position and/or orientation of the cam 358 with respect to the handle 316. At least a portion of the outer surface 358a may be at least slightly eccentrically shaped, or the entire outer surface 358a of the cam 358 may be circularly or cylindrically shaped.

As shown in FIG. 7, the kitchen appliance 310 preferably includes a seat 360 on the exterior surface 340a of the lid 340. The seat 360 is preferably positioned at a center of the exterior surface 340a of the lid 340, and preferably extends at least slightly upwardly and/or outwardly from the exterior surface 340a of the lid 340. Alternatively, the seat 360 may be a depression or groove that extends at least slightly inwardly into the exterior surface 340a of the lid 340. An exterior surface of the seat 360, which preferably opposes the exterior surface 340a of the lid 340, is preferably slightly curved, arcuate and/or concave, so as to receive at least a portion of the handle 316 in the engaged position. The seat 360 may be directly attached to and/or integrally formed with the exterior surface 340a of the lid 340, or the seat 360 may be a portion of a lid handle (not shown), such as the lid handle 42 described above and shown in FIGS. 1 and 2 with respect to the first preferred embodiment.

More particularly, when the handle 316 is in the engaged position (shown in solid lines in FIG. 7), at least a portion of the cam 358 preferably directly contacts at least a portion of the lid 340 and/or the seat 360. When the handle 316 is in the engaged position, the cam 358 preferably applies a downward force to the exterior surface 340a of the lid 340 and/or the exterior surface of the seat 360 to retain the lid 340 in sealing engagement with the container rim 330b to inhibit leakage of the contents from the interior of the container 330. When the handle 316 is in the disengaged position (shown in broken lines in FIG. 7), the cam 358 is separated from the exterior surface 340a of the lid 340 and the exterior surface of the seat 360, such that the downward force is removed, which permits the lid 340 to be removed from the container rim 330b. When the handle 316 is in the disengaged position, at least a portion of the cam 358 may or may not directly contact a portion of the exterior surface 313 of the housing 312.

Figure 8:
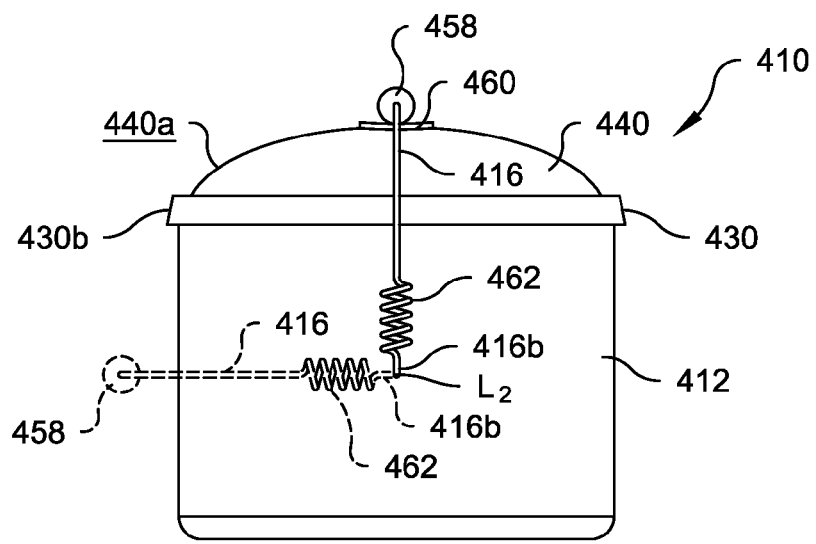
FIG. 8 is a side elevational view of the kitchen appliance according to a fifth preferred embodiment of the present disclosure, wherein the handle is shown in the engaged position in solid lines and the handle is shown in the disengaged position in broken lines.

FIG. 8 shows a fifth preferred embodiment of the kitchen appliance 410. The reference numerals of the fifth preferred embodiment are distinguishable from those of the first preferred embodiment by a factor of four-hundred (400), but otherwise indicate the same elements as indicated in the first preferred embodiment, except as otherwise specified. At least portions of the kitchen appliance 410 of the fifth preferred embodiment, such as the housing 412 and the container 430, are substantially similar to those of the fourth preferred embodiment described above. While the cam 458 and the seat 460 are shown in FIG. 8 and described as part of the fifth preferred embodiment below, either or both of the features may be omitted without disrupting the functionality described below. The description of certain similarities between the embodiments may be omitted herein for the sake of brevity and convenience, and, therefore, is not limiting.

A distinguishing feature of the fifth preferred embodiment is that the kitchen appliance 410 preferably includes at least one biasing member 462 engaged with and/or attached to a least a portion of the handle 416 for biasing the handle 416 toward the lid 440 and/or toward the housing 412 when the in the handle 416 is in the engaged position. More preferably, the kitchen appliance 410 and/or the handle 416 includes two spaced-apart biasing members 462 (only one shown in FIG. 8). Each biasing member 462 is preferably located proximate and/or attached to one of the first and second ends 416b (first end not shown in FIG. 8) of the handle 416. Each biasing member 462 is shown herein as a tension coil spring, but the biasing member 462 is not limited to such a size, shape and/or configuration. For example, the biasing member 462 may simply be an elastic material, such as a rubber or elastomeric band, while the surrounding or attached portion of the handle 416 is formed a light weight, high strength material, such as a polymeric or metallic material.

When the handle 416 is in the engaged position (shown in solid lines in FIG. 8), the biasing member(s) 462 preferably urges at least the midportion of the handle 416, such as the cam 458, toward a geometric center of the housing 412 and/or the container 430. When a user desires to move the handle 416 to the disengaged position (shown in broken lines in FIG. 8) to remove the lid 420 from the container rim 430b, the user preferably lifts the handle 416 at least partially upwardly from the exterior surface 440a of the lid 440 and/or the exterior surface of the seat 460 to separate the handle 416 and/or the cam 458 therefrom. At this point, the user preferably rotates the handle 416 with respect to the lid 440, the container 430 and the housing 412 in either a first rotational direction (i.e., clockwise) or a second rotational direction (i.e., counter-clockwise) until the lid 440 can be removed from the container 430. The biasing force created by the biasing member 462 preferably pulls and/or urges the handle 416 inwardly in both the engaged and disengaged positions. Such biasing force may "snap" the handle 416 toward and/or against one of the lid 440, the container 430 and the housing 412 when the user releases the handles 416 and/or the cam 458.

Figure 9:
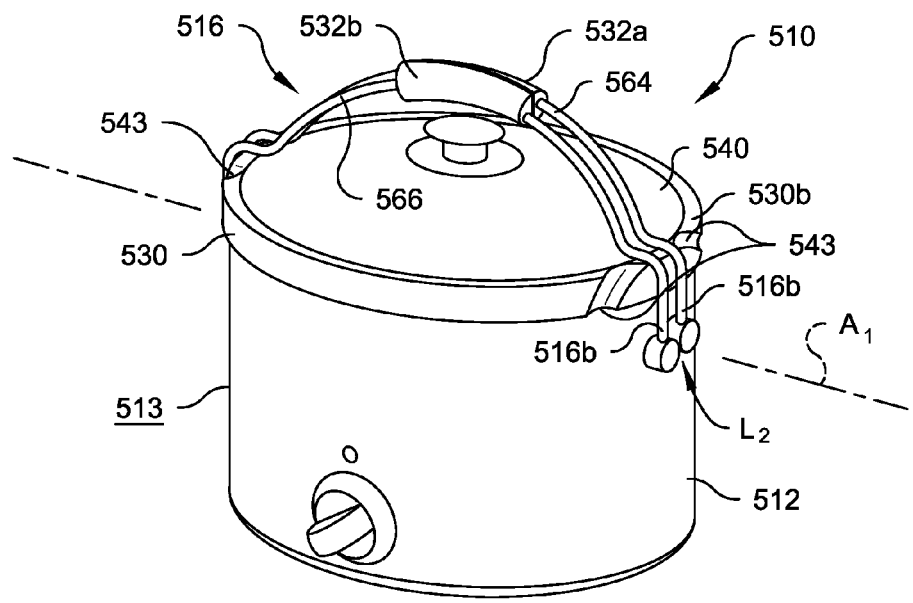
FIG. 9 is a top front perspective view of the kitchen appliance according to a sixth preferred embodiment of the present disclosure, wherein the handle is shown in the engaged position.
Figure 10:
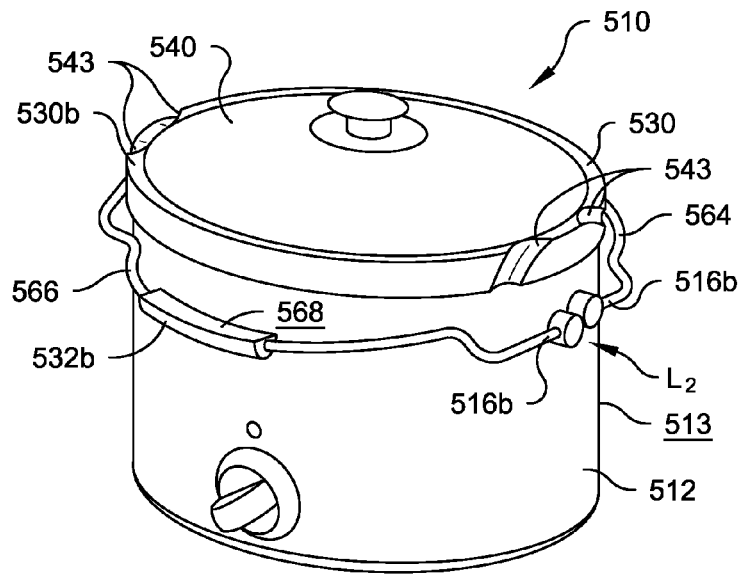
FIG. 10 is a top front perspective view thereof, wherein the handle is shown in the disengaged position.

FIGS. 9 and 10 show a sixth preferred embodiment of the kitchen appliance 510. The reference numerals of the sixth preferred embodiment are distinguishable from those of the first preferred embodiment by a factor of five hundred (500), but otherwise indicate the same elements as indicated in the first preferred embodiment, except as otherwise specified. At least portions of the kitchen appliance 510 of the sixth preferred embodiment, such as the housing 512, the container 530 and the lid 540 are substantially similar to those of the first preferred embodiment described above. The channel(s) 543 may or may not be included in the sixth preferred embodiment. The description of certain similarities between the embodiments may be omitted herein for the sake of brevity and convenience, and, therefore, is not limiting.

A distinguishing feature of the sixth preferred embodiment is that the handle 516 includes a first half or portion 564 and a second half or portion 566. The first half 564 is preferably separable from the second half 566, such that in the disengaged position (FIG. 10) the first half 564 is positionable on one side of the housing 512 and the second half 566 is positionable on an opposing side of the housing 512. The first end (not shown) of each half 564, 566 is preferably pivotally mounted to the exterior surface 513 of the side wall 512b of the housing 512 at a first location (not shown in FIGS. 9 and 10, but see $L_1$ of FIGS. 1 and 2) and the opposing second end 516b of each half 564, 566 is preferably pivotally mounted to the exterior surface 513 of the side wall 516b of the housing 516 at the second location $L_2$ generally opposed to the first location.

Each of the first and second halves 564, 566 of the handle 516 are preferably pivotable between the engaged position and the disengaged position. In the engaged position of the handle 516, at least a portion of each half 564, 566 preferably directly contacts at least a portion of the lid 540 to retain the lid 540 in sealing engagement with the container rim 530b to inhibit leakage of the contents from the interior of the container 530. In the disengaged position, the portion of each half 564, 566 is preferably spaced-apart from the lid 540 to permit the lid 540 to be removed from the container rim 530b. In the engaged position, the first and second halves 564, 566 preferably extend generally, if not exactly, parallel to the major axis $A_1$ of the housing 516.

As shown in FIG. 9, the first and second halves 564, 566 are preferably directly attachable and/or lock together in the engaged position of the handle 516. More specifically, the gripping member 532 of the handle 516 preferably includes a segment or half 532a, 532b on each half 564, 566 of the handle 516. Each half 532a, 532b of the gripping member 532 may include a magnet (not shown) at least partially embedded therein, or an interior surface 568 (see FIG. 10) of one or both of the halves 532a, 532b of the gripping member 532 is magnetized. As a result, the halves 564, 566 of the handle 516 are preferably urged and/or biased together when the halves 564, 566 are within a sufficiently close proximity above the lid 540 and/or the housing 512. However, the halves 532a, 532b of the gripping member 532 are not limited to such a configuration, but may include alternative attachment features, such as a tongue and groove connection, or no attachment feature.

Figure 11:
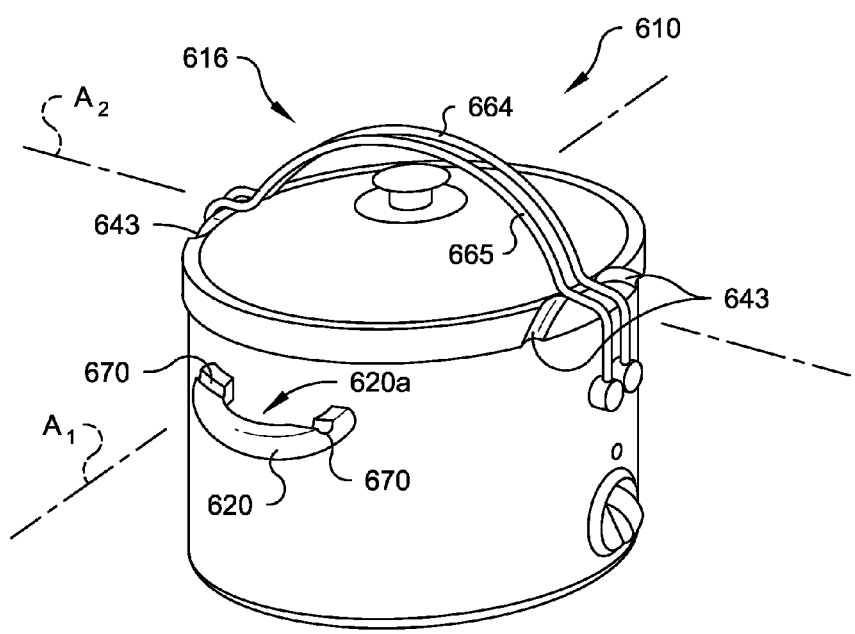
FIG. 11 is a top front perspective view of the kitchen appliance according to a seventh preferred embodiment of the present disclosure, wherein the handle is shown in the engaged position.
Figure 12:
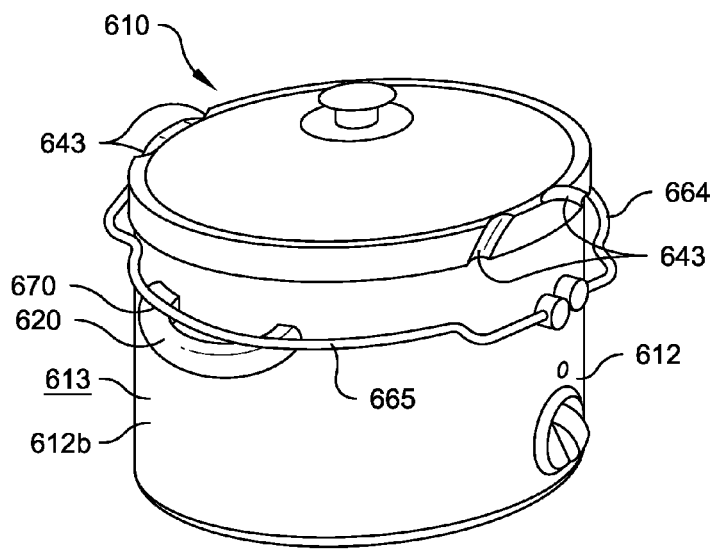
FIG. 12 is a top front perspective view thereof, wherein the handle is shown in the disengaged position.

FIGS. 11 and 12 show a seventh preferred embodiment of the kitchen appliance 610. The reference numerals of the seventh preferred embodiment are distinguishable from those of the first preferred embodiment by a factor of six hundred (600), but otherwise indicate the same elements as indicated in the first preferred embodiment, except as otherwise specified. The kitchen appliance 610 of the seventh preferred embodiment is substantially similar to that of the sixth preferred embodiment described above. The channel(s) 643 may or may not be included in the sixth preferred embodiment. The description of certain similarities between the embodiments may be omitted herein for the sake of brevity and convenience, and, therefore, is not limiting.

A distinguishing feature of the seventh preferred embodiment is that in the engaged position of the handle 616, the first and second halves 664, 665 extend generally, if not exactly, perpendicularly to the major axis $A_1$ of the housing 612. Thus, in the engaged position of the handle 616, the first and second halves 664, 665 extend generally, if not exactly, parallel to the minor axis $A_2$ of the housing 612. However, the handle 616 is not limited to such a configuration and/or orientation, as the first and second halves 664, 665 may extend in a plane at some angle between the major and minor axes $A_1$, $A_2$ of the housing 612.

It is preferred that at least one housing handle 620 extends outwardly from the exterior surface 613 of the side wall 612b of the housing 612. In the preferred embodiment, the housing handle 620 is preferably U or C-shaped, and includes an opening 620a between opposing ends of the handle 620 to permit the passage of a user's hand or fingers(s) at least partially therethrough. More preferably, two housing handles 620 (only one shown in each of FIGS. 11 and 12) preferably extend outwardly from opposing portions of the exterior surface 613 of the side wall 612b of the housing 612 to enable a user to grasp and lift the kitchen appliance 610 for movement thereof. Preferably, the housing handles 620 are in diametrically opposed relation to one another and are disposed along the major axis $A_1$ of the housing 612. Although the housing handle(s) 620 are shown in FIGS. 11 and 12 as being entirely stationary or fixedly attached to the housing 612, at least a portion of each handle 620 may be pivotally attached to the side wall 612b of the housing 612, so that the handles 620 can at least partially fold or collapse to reduce the outer width of the kitchen appliance 610 for storage purposes.

In the disengaged position of the handle 616, each of the first and second halves 664, 665 preferably contact at least a portion of one of the housing handles 620. For example, at least a portion of each half 664, 665 directly engages and/or contacts a top surface of one of the housing handles 620. Therefore, the housing handles 620 preferably define an outer limit of rotation of the halves 664, 665. Additionally or alternatively, each housing handle 620 may include a groove 670 extending downwardly from a top surface of the housing handle 620. Each groove 670 is preferably sized and/or shaped to receive at least a portion of one of the halves 664, 665 therein. As shown in FIG. 11, the groove 670 of each housing handle 620 is preferably at least slightly curved or arcuate in shape to match the shape of the halves 664, 665 of the handle 616.

FIGS. 13-17C show an eighth preferred embodiment of the kitchen appliance 710. The reference numerals of the eighth preferred embodiment are distinguishable from those of the first preferred embodiment by a factor of seven hundred (700), but otherwise indicate the same elements as indicated in the first preferred embodiment, except as otherwise specified. At least portions of the kitchen appliance 710 of the eighth preferred embodiment, such as the housing 712, the container 730 and the lid 740, are substantially similar to those of the first through third preferred embodiments described above. For example, similar to the third preferred embodiment (see FIGS. 5-6B) described in detail above, the lid 740 preferably includes two spaced-apart tabs 756 extending outwardly beyond the outer edge thereof from diametrically opposing points on the lid 740. The description of certain similarities between the embodiments may be omitted herein for the sake of brevity and convenience, and, therefore, is not limiting.

Figure 17:
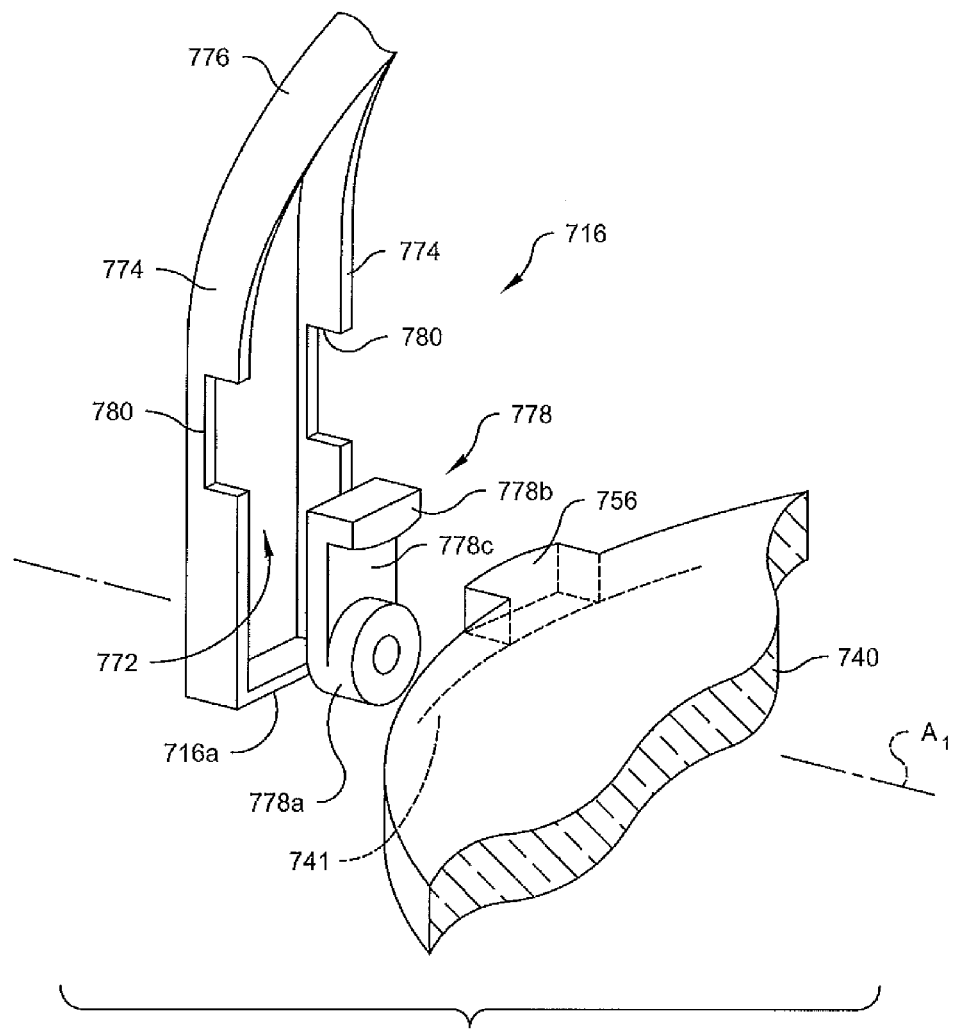
FIG. 17 is an enlarged partially cross-sectional exploded top perspective view of a portion of the kitchen appliance of FIGS. 13-15.
Figure 17A:
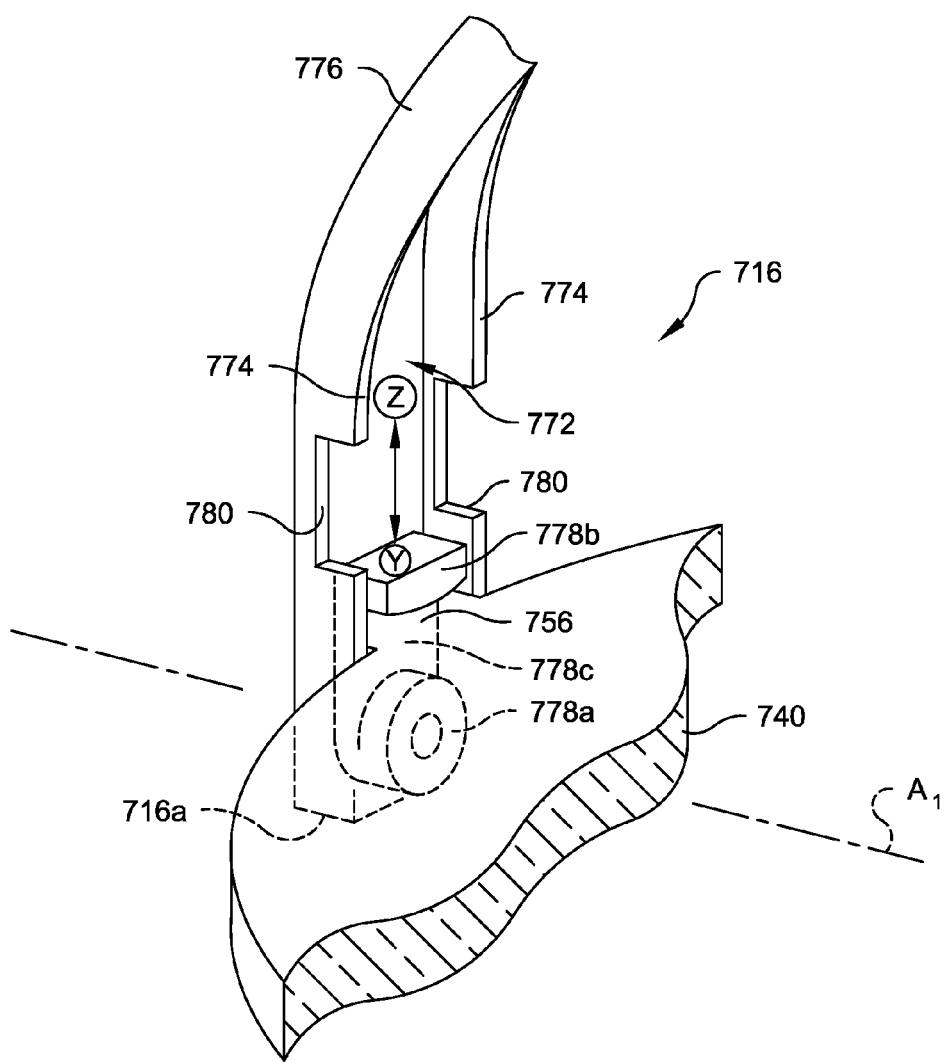
FIG. 17A is an enlarged partially cross-sectional top perspective view of a portion of the kitchen appliance shown in the configuration of FIGS. 13 and 16A.
Figure 17B:
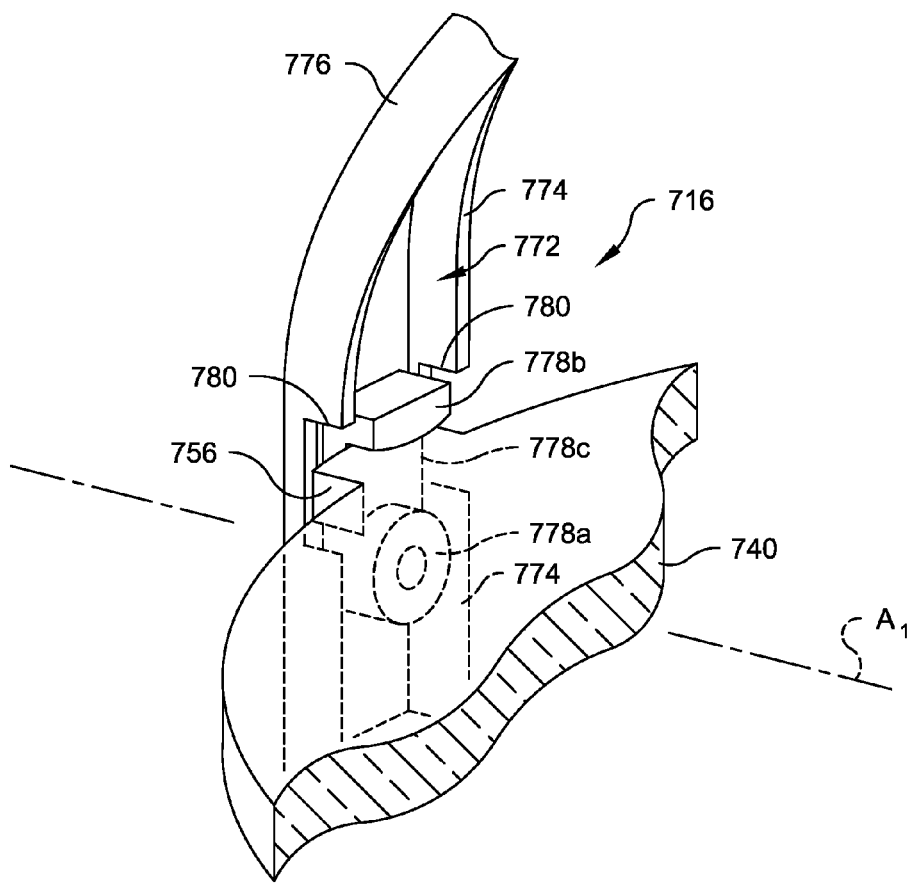
FIG. 17B is an enlarged partially cross-sectional top perspective view of a portion of the kitchen appliance shown in the configuration of FIGS. 14 and 16B.

The handle 716 is primarily the distinguishing feature of the eight preferred embodiment. The handle 716 is preferably rotationally pivotable between the engaged position (FIGS. 13, 14, 16A, 16B, 17A and 17B) and the disengaged position (FIGS. 15, 16C and 17C), as are each of the preferred embodiments described above. In addition, the handle 716 is preferably linearly movable or slidable between a locked position (FIGS. 13, 16A and 17A) and an unlocked position (FIGS. 14, 16B and 17B). In FIG. 17A, the locked position is when the pivot member(s) 778 (described in detail below) is in position "Y" with respect to the handle 716 (as shown in FIG. 17A) and when the pivot member(s) 778 is in position "Z" with respect to the handle 716. In the locked position, at least a portion of the handle 716 is preferably vertically raised and the entire handle 716 is preferably prevented from pivoting until at least a portion of the handle 716 is moved downwardly to the unlocked position. The locked position of the handle 716 is intended to be used during carrying or transport of the kitchen appliance 710, and prevents the lid 740 from being inadvertently removed from the container 730. In the unlocked position, at least a portion of the handle 716 is preferably vertically lowered and the entire handle 716 is preferably permitted to rotate or pivot, as described in the preferred embodiments described in detail above. The unlocked position of the handle 716 is intended to be used when the kitchen appliance 10 is placed on a table top or counter top, such as shortly prior to consumption of the foodstuff.

To permit and/or provide for the functionality described above, the handle 716 includes several unique or distinctive features. More specifically, the handle 716 preferably includes an arcuate connection portion 776 and a channel 772 on an interior surface thereof. The connection portion 776 and the channel 772 preferably extend from the first end 716a of the handle 716 to the second end 716b thereof. The connection portion 776 is preferably gripped or grasped by the user when moving the handle 716 between the engaged and disengaged positions, and between the locked and unlocked positions. The channel 772 is preferably defined by and/or between two spaced-apart and opposing side walls 774 of the handle 716. Each side wall 774 includes at least one and preferably two-spaced apart notches or cut-outs 780 therein. Thus, it is preferred that each side wall 774 includes two notches 780 proximate the first end 716a of the handle 716 and two separate notches 780 proximate the second end 716b of the handle 716. As shown in FIG. 17, each notch 780 is preferably spaced-apart a predetermined distance from the first or second end 716a, 716b of the handle 716.

The handle 716 of the eight preferred embodiment also includes at least one and preferably two spaced-apart pivot members 778 mounted to diametrically opposing points on the exterior surface 713 of the side wall 716b of the housing 716. At least a portion of the connection portion 776 of the handle 716 surrounds at least a portion of each pivot member 778. In other words, each pivot member 778 is at least partially positioned within the channel 772 formed on the connection portion 776 of the handle 716. The connection portion 776 is preferably movable with respect to each pivot member 778 between a raised position (i.e., the locked position) in which the handle 716 is pivotable between the engaged and disengaged positions and a lowered position (i.e., the unlocked position) in which the connection portion 776 of the handle 716 prevents the pivot members 778 from pivoting with respect to the housing 712.

As shown in FIG. 17, each pivot member 778 preferably includes a lower end 778a, which directly engages to and/or surrounds a pivot pin 782 (see FIGS. 16A-16C) attached to the side wall 712b of the housing 712, and an upper end 778b, which extends inwardly toward the housing 712, the container 730 and/or the lid 740. A length of each pivot member 778, as measured from a top of the upper end 778b to a bottom of the lower end 778a, is preferably at least slightly less than the distance between a lower end of each notch 780 and the adjacent end 716a, 716b of the handle 716. A recessed portion 778c is preferably formed between the lower and upper ends 778b of each pivot member 778. The recessed portion 778c is preferably sized and/or shaped to receive at least a portion of one of the tabs 756 and/or allow at least a portion of one of the tabs 756 to pass therethrough.

Figure 17C:
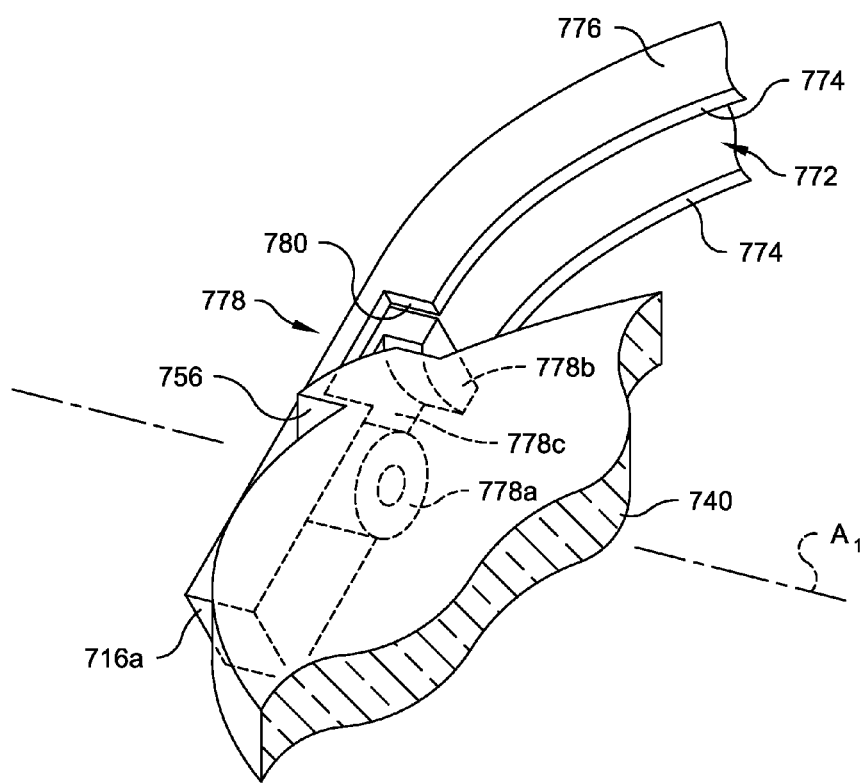
FIG. 17C is an enlarged partially cross-sectional top perspective view of a portion of the kitchen appliance shown in the configuration of FIGS. 15 and 16C.

As shown in FIGS. 16A-16C and 17A-17C, each pivot member 778 is preferably rotationally pivotable between an engaged position (FIGS. 16A, 16B, 17A and 17B) and a disengaged position (FIGS. 16C and 17C). The pivot members 778 preferably move between the engaged and disengaged positions when the connection portion 776 of the handle 716 moves between the engaged and disengaged positions. In other words, when the handle 716 is in the unlocked position (FIGS. 14, 16B and 17B), it is preferred that rotation of the handle 716 between the engaged and disengaged positions automatically rotates each pivot member 778 between the engaged and disengaged positions. However, when the handle 716 is in the locked position, such that at least a portion of one of the tabs 756 of the lid 740 is positioned at least partially below or above a respective notch 780 in the side wall 774 of the handle 716, the handle 716 is prevented from pivoting. In such a position, an inner surface of the portion of the side walls 774 of the handles 716 below or above the notches 780 directly engage a lateral side of at least one or both of the tabs 756 of the lid 740, thereby preventing the pivot members 778 and the remainder of the handle 716 from pivoting. When the connection portion 776 of the handle 716 is lowered or raised a sufficient distance such that the notches 780 align with the tabs 756 of the lid 740, the side walls 774 of the connection portion 776 no longer directly engage or block movement of the handle 716, such that the tabs 756 may pass through the respective notches 780.

In the engaged position of the pivot member(s) 778, at least a portion of each pivot member 778, such as a lower surface of the upper end 778b, preferably directly contacts at least a portion of one of the tabs 756 to retain the lid 740 in sealing engagement with the container 730 to inhibit leakage of the contents from the interior of the container 730. The upper end 778b of each pivot member 778 preferably imparts a downwardly force onto one of the tabs 756 to a least partially compress the gasket (741) to prevent leakage of the contents of the container 730. In the disengaged position of the pivot member(s) 778, each pivot member 778 is preferably spaced-apart from and/or below the housing rim 712c to permit the lid 740 to be removed from the container 730.

Figure 13:
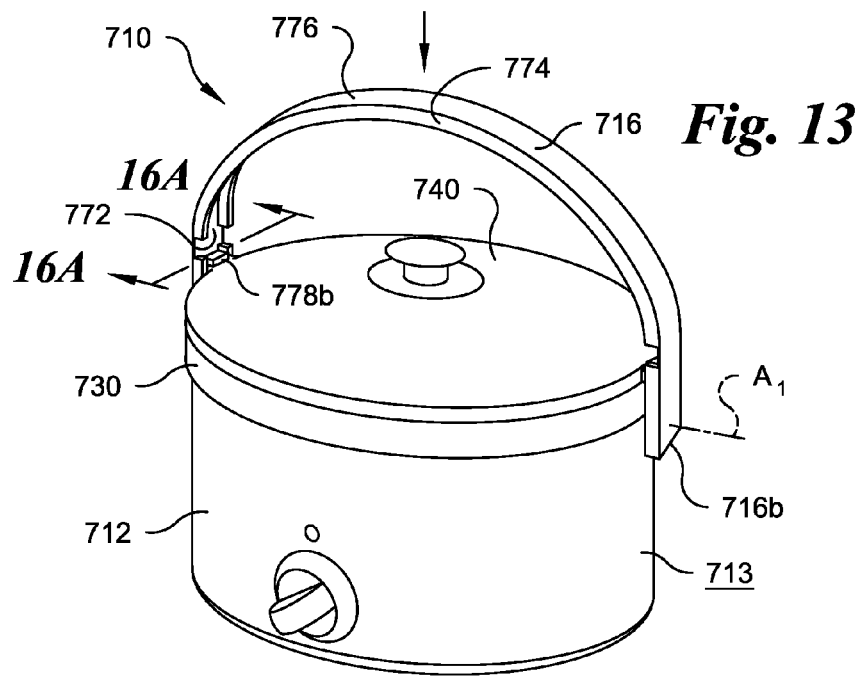
FIG. 13 is a top front perspective view of the kitchen appliance according to an eighth preferred embodiment of the present disclosure, wherein the handle is shown in the engaged and locked position.
Figure 14:
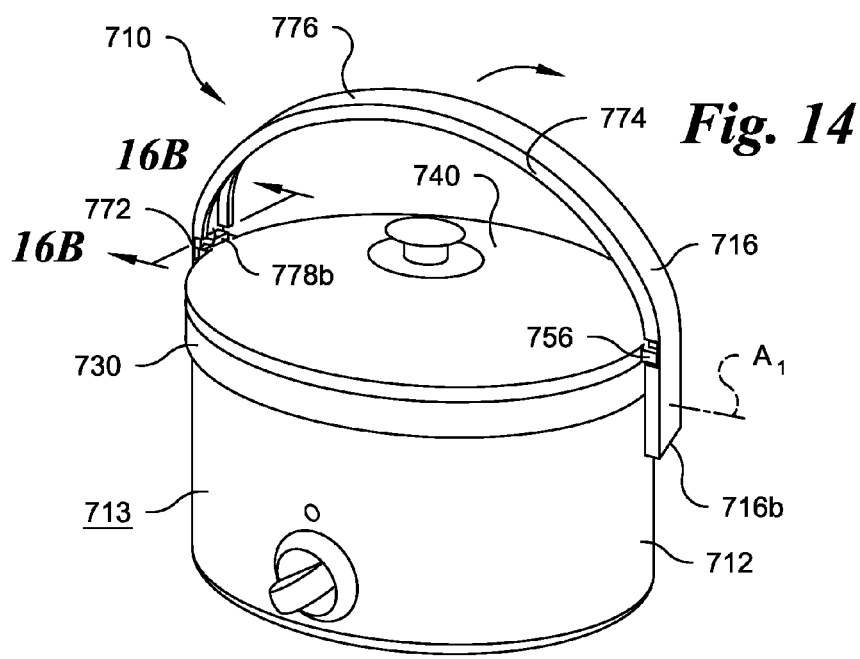
FIG. 14 is a top front perspective view thereof, wherein the handle is shown in the engaged position and an unlocked position.

FIGS. 13, 16A and 17A show the handle 716 in the engaged and locked positions. In such a configuration, it is preferably not possible to remove the lid 740 from the container 730, as the upper end 778b of each pivot member 778 preferably holds and/or seals the lid 740 onto the container 730. In addition, in such a configuration, it is preferably not possible to pivot the handle 716 to the disengaged position, as the combination of the side walls 774 of the handle 716 below the notches 780 and the tabs 756 of the lid 740 engaged to prevent rotation of the handle 716.

FIGS. 14, 16B and 17B show the handle 716 in the engaged and unlocked positions. In such a configuration, it is preferably not possible to remove the lid 740 from the container 730, as the upper end 778b of each pivot member 778 preferably holds and/or seals the lid 740 onto the container 730. However, in such a configuration, it is preferably possible to pivot the handle 716 to the disengaged position, thereby allowing the lid 740 to be removed from the container 730. In such a configuration, the notches 780 of the handle 716 are preferably vertically aligned with the tabs 756 of the lid 740, which permits the tabs 756 to pass through the respective notches 780 when the handle 716 is rotated or pivoted, thereby permitting rotation or pivoting of the handle 716.

FIGS. 15, 16C and 17C show the handle 716 in the disengaged and unlocked positions. In such a configuration, it is preferably possible to remove the lid 740 from the container 730, as the upper end 778b of each pivot member 778 is laterally spaced-apart from one of the tabs 756 of the lid 740, thereby permitting the lid 740 to be removed from the container 730. Although not shown in the drawings, the handle 716 may be rotated in the disengaged and unlocked positions until at least a portion of the handle 716, such as the connection portions 776, contacts or engages the exterior surface 713 of the side wall 712b of the housing 712. The handle 716 is not a required element of the present embodiment, as the lid 740 may be sealingly secured to the container 730 if the handle 716 is not included or removed from the present invention. For example, one or each pivot member 778 could be directly grasped by the user and rotated into or out of the engaged position.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A kitchen appliance comprising:
   a housing having a base and a side wall extending therefrom, the side wall having an exterior surface and an opposing interior surface, at least portions of the interior surface of the side wall and base defining a cavity within the housing, the housing having a housing rim at a first, free edge of the side wall defining an opening to the cavity;
   a heating or cooling element disposed within the housing proximate the cavity to heat or cool the cavity;
   a container having a generally hollow interior and a container rim defining an opening for accessing the interior thereof, the interior of the container being capable of retaining contents therein, the container being sized and shaped to fit within the cavity of the housing;
   a lid sized and shaped to at least partially cover the opening of the container when placed on the container, the lid having an exterior surface and an opposing interior surface facing the interior of the container when the lid is placed on the container, the lid further comprises two spaced-apart tabs extending outwardly beyond an outer edge thereof from diametrically opposing points on the lid;

a handle pivotally mounted to the exterior surface of the side wall of the housing, a first end of the handle being pivotally mounted to the exterior surface of the side wall of the housing at a first location, an opposing second end of the handle being pivotally mounted to the exterior surface of the side wall of the housing at a second location generally opposed to the first location, the handle being pivotable between an engaged position in which at least a portion of the handle contacts at least a portion of the lid to retain the lid in sealing engagement with the container rim to inhibit leakage of the contents from the interior of the container and a disengaged position in which the portion of the handle is spaced-apart from the lid to permit the lid to be removed from the container rim, the handle further comprises a connection portion and two spaced-apart pivot members mounted to diametrically opposing points on the exterior surface of the side wall of the housing, each pivot member being pivotable between an engaged position in which at least a portion of the pivot member contacts at least a portion of the one of the tabs to retain the lid in sealing engagement with the container to inhibit leakage of the contents from the interior of the container and a disengaged position in which the pivot member is spaced-apart below the housing rim to permit the lid to be removed from the container; and the connection portion of the handle surrounding at least a portion of each pivot member, the connection portion being movable with respect to each pivot member between a lowered position in which the handle is pivotable between the engaged and disengaged positions and a raised position in which the connection portion of the handle prevents the pivot members from pivoting with respect to the housing.

2. The kitchen appliance according to claim 1, wherein the entire handle is pivotable from a first position in which at least a portion of the handle contacts the exterior surface of the side wall of the housing on one side thereof to a second position in which at least a portion of the handle contacts the exterior surface of the side wall of the housing at an opposing side thereof.

3. The kitchen appliance according to claim 1, wherein each pivot member is at least partially positioned within a channel formed on an interior of the handle.

4. The kitchen appliance according to claim 1, further comprising:

a gasket extending around one of the outer edge of the lid and the container rim for sealing engagement with the other of the container rim and the outer edge of the lid, the gasket being at least partially compressed when the handle is in the engaged position.

* * * * *